May 23, 1950 N. FLESCH 2,509,139
CLASP BRAKE
Filed Feb. 17, 1948 3 Sheets-Sheet 1
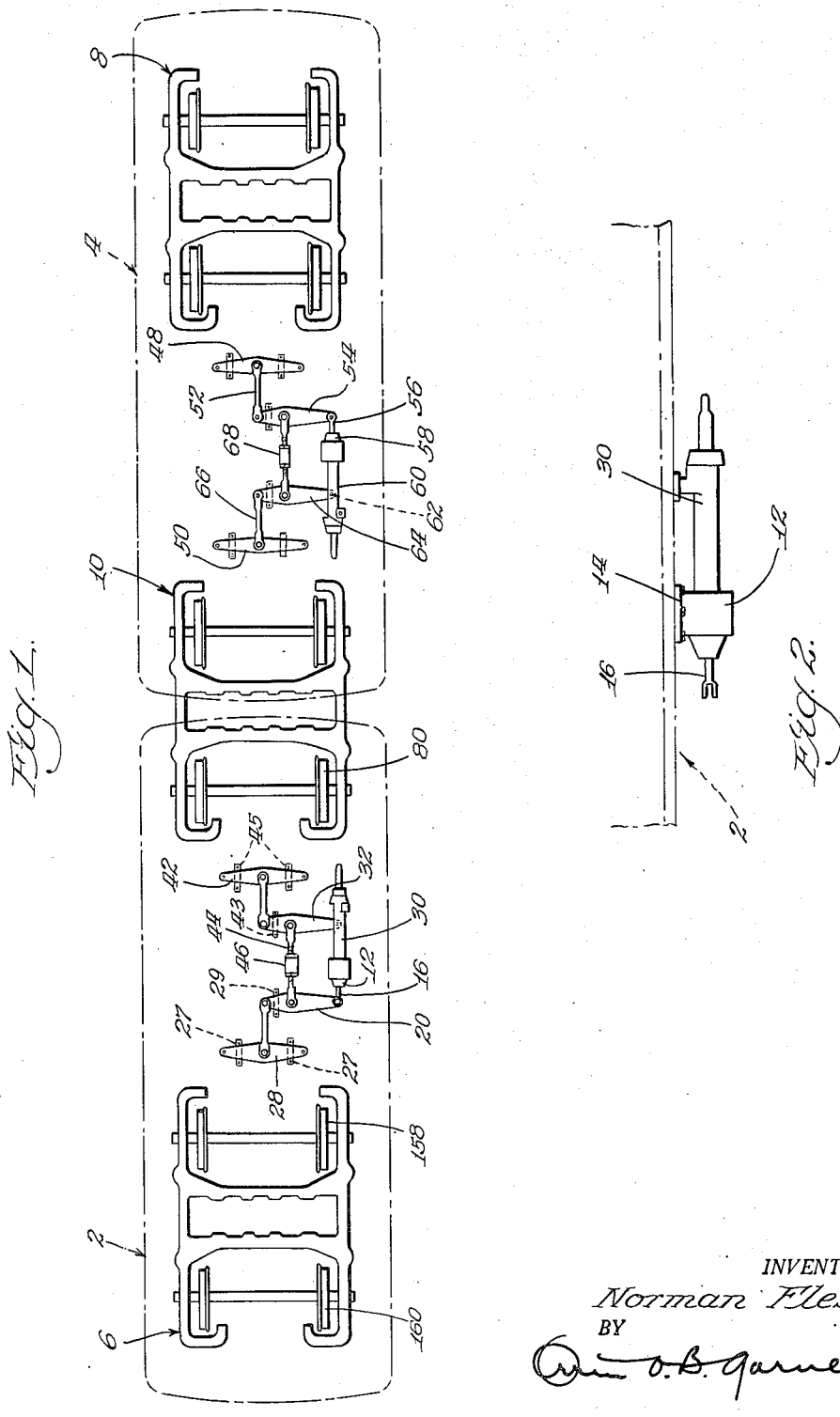
INVENTOR.
Norman Flesch
BY

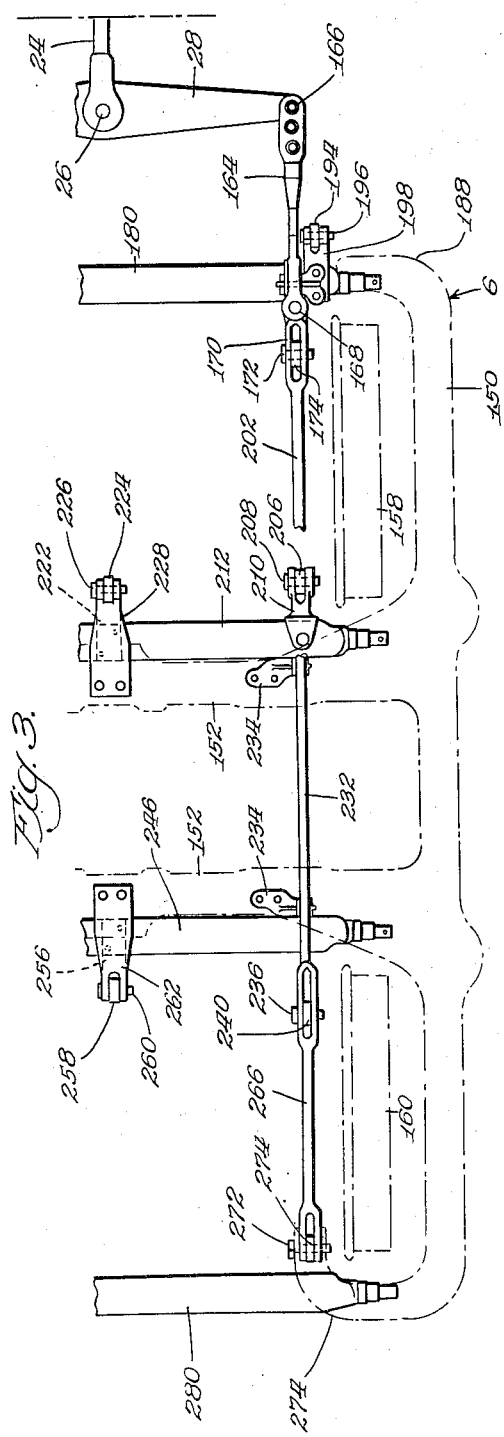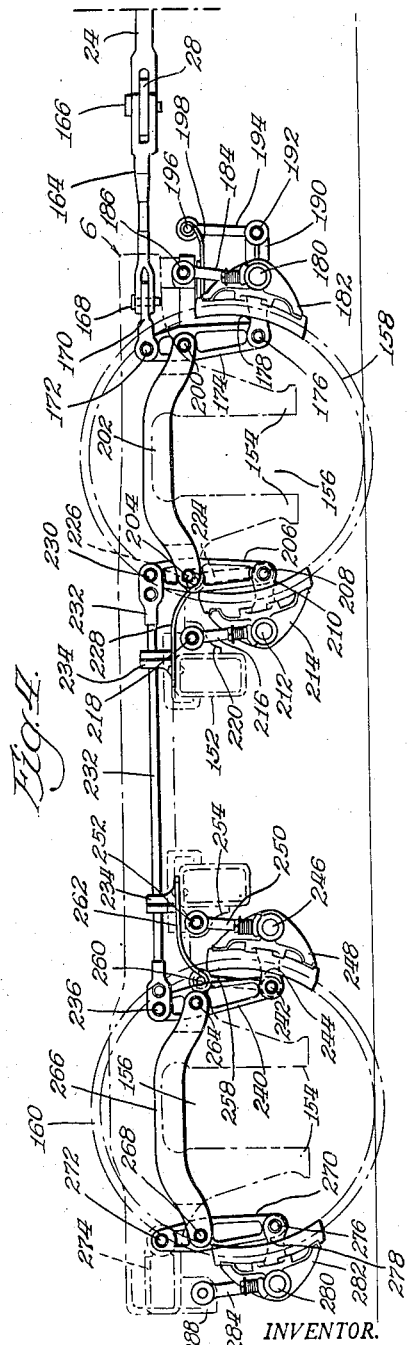

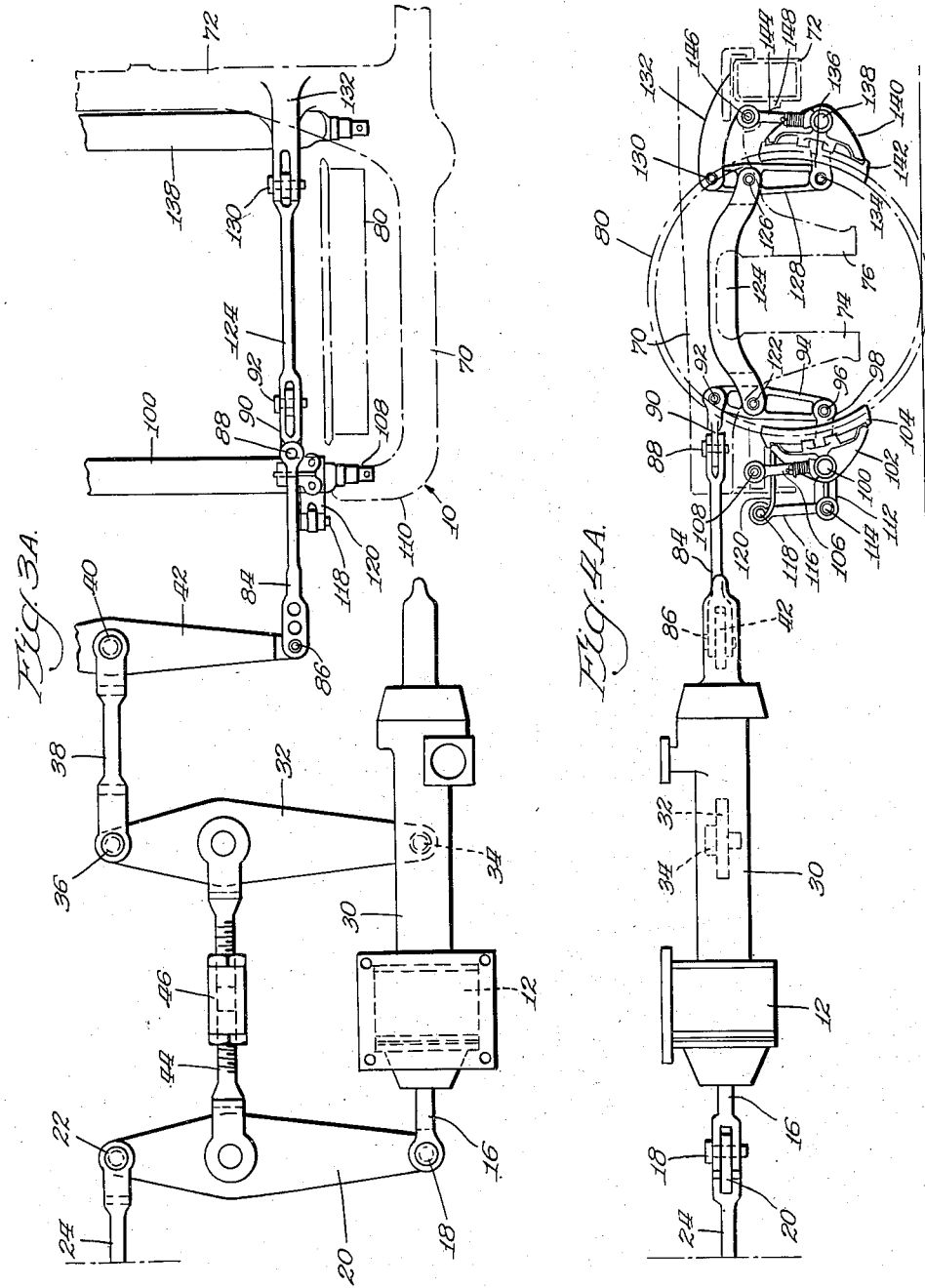

Patented May 23, 1950

2,509,139

UNITED STATES PATENT OFFICE 2,509,139

CLASP BRAKE

Norman Flesch, Chicago, Ill., assignor to American Steel Foundries, Chicago, Ill., a corporation of New Jersey Application February 17, 1948, Serial No. 8,982

7 Claims. (Cl. 188—47)

1

This invention relates to railway brake equipment and more particularly to a design of clasp brakes suitable for application to an articulated two-car train unit.

One object of the invention is to provide a clasp brake arrangement particularly adapted for application to articulated cars and especially to an arrangement wherein the adjacent ends of two cars are supported on the single truck.

A further object of the invention is to provide a simplified, efficient clasp brake system for articulated cars.

A different object of the invention is to design a clasp brake arrangement wherein a portion of the brake equipment associated with the truck upon which the cars are articulated and the entire brake equipment associated with one end truck may be operated by a single power means.

These and other objects of the invention will become apparent from the specification and the drawings, wherein:

Figure 1 is a top plan view of a two-car articulated railway vehicle unit embodying the invention;

Figure 2 is a fragmentary side elevation of the vehicle shown in Figure 1 and illustrating the mounting of the power means on the car body;

Figures 3 and 3A are top plan views of the brake arrangement associated with one end truck and the adjacent end of the intermediate truck, only one half of the end truck being shown inasmuch as it is symmetrical about its longitudinal center line and one quarter of the intermediate truck being shown for sake of simplicity inasmuch as the brake arrangement is the same on opposite ends and opposite sides of said intermediate truck; and Figures 4 and 4A are side elevations of Figures 3 and 3A respectively.

Describing the invention in detail, the train unit comprises car bodies 2 and 4 (Figure 1) which have their remote ends supported respectively on identical end car trucks 6 and 8 and their adjacent or articulated ends supported on an intermediate truck 10. Power means in the form of a cylinder 12 (Figures 3A and 4A) is supported beneath the car body 2 in the usual manner from the bracket 14 which is secured to the frame of the car body as by any convenient means. A piston stem 16 extends from one end of the cylinder 12 and is pivotally connected as at 18 to the outer end of a horizontally disposed live body or cylinder lever 20, the opposite end of the body lever 20 having a pivotal connection as at 22 to one end of a pull rod 24. The opposite end of the

2 pull rod 24 is pivotally connected as at 26 to an equalizer 28 intermediate the ends thereof. The equalizer and the body lever 20 are carried by car body 2 by means of straps 27 and 29 respectively, as will be readily understood by those skilled in the art.

A slack adjuster 30 is mounted on the opposite end of cylinder 12 and a dead horizontally disposed cylinder or body lever 32 is pivotally connected at one end as at 34 to said slack adjuster, the opposite end of said body lever 32 has a pivotal connection as at 36 to one end of the pull rod 38, said pull rod 38 having its opposite end pivotally connected as at 40 to an equalizer 42 intermediate the ends thereof. The body lever 32 and the equalizer 42 are supported from the car body by means of straps 43 and 45 respectively, in the same manner as lever 20 and equalizer 28. The body levers are joined by a pull rod 44 having pivotal connections at its ends with said body levers at points intermediate their ends. The pull rod is provided with a turnbuckle 46 which serves as a manual slack adjuster.

The equalizers 48 and 50 (Figure 1, right) are supported by the car body intermediate the adjacent ends of trucks 8 and 10 in the same manner as those already mentioned. The equalizers 48 and 50 are joined by a series of pull rod operating levers, identical with that just described, at the opposite end of the vehicle and consisting of a pull rod 52 connecting the equalizer 48 to one end of a live body or cylinder lever 54, said body lever 54 having its opposite end connected as at 56 to the piston stem extending from one end of a cylinder 58, the opposite end of the cylinder carrying a slack adjuster 60 to which is connected as at 62 the dead body or cylinder lever 64, said body lever 64 being connected to the equalizer 50 by pull rod 66. The body levers 54 and 64 are joined intermediate their ends by pull rod 68 which is identical in construction as pull rod 44.

In operation, actuation of the power means or cylinder 12 will cause a movement to the left of the piston stem 16 thus acting to spread the pivot points 18 and 34 at which the body levers 20 and 32 are respectively secured to the cylinder, and since the body levers 20 and 32 are secured intermediate their ends by the pull rod 44, their opposite ends will be drawn toward each other thus moving the pull rod 24 to the right and the pull rod 38 to the left and thus, through the medium of the equalizers 28 and 42, actuating the brakes associated therewith in a manner hereinafter described. The brake cylinder 58 and its associated levers and pull rods operate in the same manner to actuate the pull rods 52 and 66 and their respective associated equalizers 48 and 50, and thus the brake rigging associated with the opposite end of the vehicle.

Describing in more detail the truck 10 and the form of brake rigging associated therewith, said truck may consist generally of a framework comprising side rails 70 interconnected intermediate their ends by spaced transoms 72 affording the usual support means for a bolster (not shown) upon which the car bodies are carried. Each side rail may be provided adjacent its ends with pedestal legs 74 and 76 for reception of journal boxes (not shown) of the associated wheel and axle assembly 80. The journal portion of the wheel and axle assembly may support equalizers (not shown), in the usual manner, upon which the truck frame may be supported by the usual springs (not shown) as will be understood by those skilled in the art. The brake rigging for each wheel and axle assembly 80 consists of a pull rod 84 having a pivotal and adjustable connection at one end as at 86 to the adjacent end of the equalizer 42. The opposite end of the pull rod 84 is connected as at 88 to one end of a jaw member 90 and the jaw member is connected at its opposite end as at 92 to the upper end of a live truck lever 94 disposed outwardly of a wheel of the associated assembly 80. The lower end of the live truck lever 94 is pivoted as at 96 to a fulcrum 98 carried by a brake beam 100. The brake beam 100 carries at its end a brake head 102 with a brake shoe 104 adapted for engagement with the periphery of the adjacent wheel of the associated wheel and axle assembly 80. The end of the brake beam also provides a pivotal connection for the lower end of a support hanger 106, the upper end of the hanger 106 being pivoted as at 108 on an inturned portion 110 of the associated side rail 70. The brake beam 100 is also provided with a fulcrum 112 affording a pivotal connection as at 114 from the lower end of a combination balance and safety hanger 116, the upper end of said balance hanger being pivoted as at 118 to a resilient support member 120 secured to said inturned end portion 110.

The live truck lever 94 is pivoted intermediate its ends as at 122 to one end of a pull rod or bar 124 passing over the axle of the associated assembly 80, the other end of the pull rod being connected as at 126 to a dead truck lever 128 intermediate the ends thereof, the dead truck lever 128 being disposed inwardly of said wheel of the associated assembly 80. The upper end of the dead truck lever 128 is pivoted as at 130 to a fulcrum or bracket 132 which is integrally formed with the adjacent transom 72. However, it will be understood that the bracket 132 may be formed separate from said transom 72 and may be connected thereto in any convenient manner. The lower end of the dead truck lever 128 is pivoted as at 134 to a fulcrum 136 on brake beam 138. The brake beam 138 carries a brake head 140 at its end, the brake head being provided with a brake shoe 142 for engagement with the periphery of the adjacent wheel of the associated assembly 80. The end of the beam also provides a pivotal connection for the lower end of a support hanger 144, the upper end of said hanger being pivoted as at 146 to a bracket 148 on the adjacent transom 72.

Describing in more detail the truck and brake construction at the remote ends of my improved railway vehicle, the truck 6 may have the usual side members 150 joined adjacent their midpoints by spaced transoms 152 between which may be received the usual bolster (not shown), said side members having adjacent their opposite ends spaced pedestal legs 154, 154 defining journal openings 156 providing the usual method of connection respectively with the associated wheel and axle assemblies 158 and 160 at opposite ends of the truck. The truck 6 is spring-supported in the usual manner from the equalizers (not shown) which are mounted at their ends on the journal portions of the assemblies 158 and 160 as will be readily understood by those skilled in the art.

The brake arrangement for each side of the truck 6 comprises a pull rod 164 having a pivotal adjustable connection at one end as at 166 to the adjacent end of the equalizer lever 28. The opposite end of the pull rod 164 is connected as at 168 to one end of a jaw member 170, the opposite end of said jaw member being connected as at 172 to the upper end of a live truck lever 174 disposed outwardly of a wheel of assembly 158. The lower end of said live truck lever is pivoted as at 176 to a fulcrum member 178 carried by a brake beam 180. The brake beam supports a brake head and shoe assembly 182 at each end adapted for engagement with the adjacent wheel of assembly 158. The end of the beam 180 also provides a connection for the lower end of a support hanger 184, said hanger 184 having its upper end pivoted as at 186 to an inturned portion 188 of the associated side member 150 of truck 6. The beam 180 is also provided with a fulcrum 190 pivotally connected as at 192 to the lower end of a combination balance and safety hanger 194, said hanger 194 having its upper end pivoted as at 196 to a resilient support member 198 mounted on said inturned end portion 188. The live truck lever 174 is pivoted intermediate its ends as at 200 to one end of a pull rod 202 passing over the axle of assembly 158, the opposite end of said pull rod being pivoted as at 204 to a live truck lever 206 intermediate the ends thereof, the live truck lever being disposed inwardly of said wheel of assembly 158. The lower end of the live truck lever 206 is pivoted as at 208 to a fulcrum 210 connected to a brake beam 212. The ends of the brake beam 212 pivotally support a brake head and shoe assembly 214 which is adapted to engage said wheel of assembly 158. The end of the brake beam 212 also affords a pivotal connection for the lower end of a support hanger 216, said hanger 216 having its upper end pivoted as at 218 to a bracket 220 on the adjacent transom 152. The brake beam 212 is also provided at a point adjacent the longitudinal center line of truck 6 with a fulcrum 222 pivotally connected to the lower end of the combination balance and safety hanger 224, the upper end of said hanger 224 being pivoted as at 226 to a resilient support member 228 mounted on the adjacent transom 152.

The upper end of the live truck lever 206 has an adjustable pivotal connection as at 230 to one end of a pull rod 232. The pull rod 232 passes over the transoms 152 and is guidedly supported thereon by means of brackets 234, 234 mounted on the respective transoms 152, 152. The opposite end of the pull rod 232 has an adjustable, pivotal connection as at 236 to the upper end of a live truck lever 240 disposed inwardly of a wheel of assembly 160. The lower end of said live truck lever 240 is pivoted as at 242 to a fulcrum 244 carried by a brake beam 246. The brake beam 246 supports at its end a brake head and shoe assembly 248 adapted for engagement with the periphery of said wheel of assembly 160. The end of the beam 246 also affords a pivotal connection for the lower end of a support hanger 250, the upper end of said support hanger 250 being pivoted as at 252 to a support bracket 254 on the adjacent transom 152. The brake beam is also provided with a fulcrum 256 adjacent the longitudinal center line of the truck, said fulcrum having a connection with the lower end of the combination balance and safety hanger 258, the upper end of said hanger 258 being pivoted as at 260 to a resilient support member 262 mounted on the adjacent transom 152.

The live truck lever 240 is pivoted intermediate its ends as at 264 to one end of a pull rod 266, the other end of the pull rod being pivoted as at 268 to a dead truck lever 270 intermediate the ends thereof, the dead truck lever 270 being disposed outwardly of said wheel of assembly 160. The upper end of said dead truck lever 270 is pivoted as at 272 to an inturned end portion 274 of the associated side rail 150. The lower end of the dead truck lever 270 is pivoted as at 276 to a fulcrum 278 on the brake beam 280. The brake beam 280 carries a brake head and shoe assembly 282 on each end and affords a pivotal connection at its end for the lower end of a support hanger 284, the upper end of said support hanger being pivoted as at 286 to a bracket 288 on said inturned end portion 274 of the side rail 150.

It will be understood that the brake construction of trucks 6 and 8 is identical and is the same on opposite sides of said trucks wherefore only one side of truck 6 is shown.

The rigging mounted on trucks 6 and 8, as described heretofore, operates as follows. Actuation of the power means, as previously described, causes the equalizer lever 28 to be moved to the right thus moving the pull rod 164 to the right (Figures 3 and 4) thus pivoting the live truck lever 174 in a clockwise direction (Figure 4) and moving it to the right and applying the brake head and shoe assembly 182 against the adjacent wheel of the assembly 158. The lever 174, in moving to the right, pulls the rod 202 to the right and moves the live truck lever 206 to the right, the lever 206, pivoting in a counterclockwise direction, applies the brake head and shoe assembly 214 to the opposite side of the adjacent wheel of the assembly 158. The lever 206, in being moved to the right, pulls the rod 232 to the right which in turn pulls the live truck lever 240 to the right and pivots said lever 240 in a clockwise direction thus applying the brake head and shoe assembly 248 to the adjacent wheel of assembly 160. The lever 240 in moving to the right pulls the rod 266 to the right and causes the dead truck lever 270 to pivot in a counterclockwise direction thus applying the brake head and shoe assembly 282 to the opposite side of the adjacent wheel of assembly 160.

It will be understood that the rigging of truck 6 is associated and connected with the rigging carried by the adjacent half of truck 10 and the rigging of truck 8 is likewise associated and connected in operation with the rigging carried by the other half of truck 10 and therefore adjacent truck 8.

Referring now to the operation of the half of the brake rigging of truck 10 adjacent truck 6, simultaneously with the operation of the rigging of truck 6, the pull rod 38 (Figure 3A) is pulled to the left by the lever 32 through the action of lever 20 and pull rod 44. Movement of pull rod 38 causes the equalizer lever 42 to move to the left, in turn causing the pull rod 84 to move to the left, said pull rod 84 thus actuating the live truck lever 94 by pulling it to the left and rotating it in a counterclockwise direction (Figure 4A) thus applying brake shoe 104 mounted on head 102 against the periphery of the adjacent wheel of assembly 80. The live truck lever 94, being connected to the pull rod 124, moves the rod 124 to the left whereby the dead truck lever 128 is rotated in a clockwise direction thus applying the brake shoe 142 carried by head 140 against the opposite side of said adjacent wheel of assembly 80.

Release of the power means will result in movement of the mechanism in the reverse of that just described.

It will be noted that I have provided a brake arrangement for a multiple unit railway vehicle wherein each spaced truck has a unitary brake rigging and the common truck has independent rigging at its opposite ends, the unitary rigging on each end truck being associated in operation with the rigging mounted independently on the adjacent end of the common truck.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway vehicle, two car bodies, spaced end trucks each supporting a car body, a center truck supporting both car bodies, brake equipment comprising power means and slack adjuster means mounted on each of said car bodies, a live cylinder lever connected to each power means, a dead cylinder lever connected to each slack adjuster means, a connection between adjacent live and dead cylinder levers intermediate the ends thereof, an equalizer mounted on each car body adjacent each end of said center truck, an equalizer member carried by each car body adjacent each end truck, a pull rod associated with each equalizer member pivoted thereto and to the adjacent live cylinder lever, a pull rod associated with each equalizer pivoted thereto and to the adjacent dead cylinder lever, brake rigging carried by each end truck and having operative connections with the adjacent equalizer member and including pull rods directly pivoted thereto, and independent brake means at opposite ends of said center truck and each connected to the adjacent equalizer by pull rods pivotally connected thereto, said brake means comprising a live truck lever disposed outwardly of a wheel, a dead truck lever disposed inwardly of said wheel, and a connection between said live and dead truck levers intermediate the ends thereof, said equalizers being movable with the associated car bodies.

2. In a railway vehicle including two car bodies supported at their adjacent ends on a common truck and at opposite ends on spaced trucks, brake equipment comprising power means and slack adjuster means mounted on a car body, live and dead cylinder levers connected at their outer ends to said power means and slack adjuster means, respectively, and connected intermediate their ends to each other, an equalizer supported from said car body, a pull rod pivoted to the inner end of said dead lever and to said equalizer intermediate the ends thereof, brake rigging at one end of said common truck including live truck levers at the end of said common truck adjacent said equalizer, a pull rod at each end of said equalizer connected thereto and to the adjacent truck lever, an equalizer member supported from said car body, a pull rod pivoted to said member intermediate the ends thereof and to the inner end of said live cylinder lever, and brake means for the spaced truck adjacent said member comprising live lever elements at the adjacent end of said last-mentioned truck and a pull rod at each end of said member pivoted thereto and directly connected to the adjacent lever element.

3. In a railway vehicle comprising two car bodies mounted at their adjacent ends on a common truck and at their remote ends on spaced trucks, unified brake means for each spaced truck and adjacent end of said common truck, each of said brake means comprising live truck levers at adjacent ends of the associated spaced truck and said common truck, a power cylinder and a slack adjuster mounted on the adjacent car body intermediate the last-mentioned trucks, live and dead cylinder levers interconnected intermediate their ends and connected at one of their ends to said cylinder and slack adjuster, respectively, equalizers mounted on the associated car body adjacent each cylinder lever, a pull rod pivotally connecting the other end of each cylinder lever to the adjacent equalizer intermediate the ends thereof, and pull rods pivotally connected to the ends of said equalizers and the adjacent live truck levers.

4. In a railway vehicle having two end trucks and an intermediate truck supporting two car bodies, unified brake means for each end truck and adjacent end of said intermediate truck, each of said brake means comprising power means and slack adjuster means mounted on the associated car body, live and dead cylinder levers interconnected intermediate their ends and connected at one of their ends to said power means and slack adjuster means, respectively, equalizers supported from the last-mentioned car body adjacent each cylinder lever, pull rods pivoted to the inner ends of said cylinder levers and to adjacent equalizers intermediate the ends thereof, live truck levers at adjacent ends of the associated end truck and intermediate truck, and pull rods pivoted to the ends of said equalizers and each pivotally connected to the adjacent live truck lever, all of said connections lying in a common substantially horizontal plane.

5. In a railway vehicle comprising two car bodies supported at adjacent ends on a common truck and at opposite ends on spaced trucks, each truck comprising a frame, independent brake riggings disposed at opposite ends of said common truck, brake means for each spaced truck, said brake means having their live ends adjacent said common truck and their dead ends remote therefrom, said riggings being dead ended intermediate the ends of said common truck and having their live ends at respective ends of said common truck, and power means mounted on each car body between the associated spaced truck and said common truck and operatively connected to the live end of the adjacent brake means and to the live end of the adjacent rigging, said connections being disposed in a common substantially horizontal plane below the top surfaces of the truck frame.

6. In a railway vehicle including a plurality of car bodies, a truck supporting adjacent ends of said car bodies, spaced trucks supporting the remote ends of said car bodies, and brake equipment comprising power means and slack adjuster means mounted on a car body, live and dead lever members having their outer ends connected to said power means and adjustably connected intermediate their ends to each other, an equalizer connected to each lever member by a pull rod fixedly pivoted to each lever member and associated equalizer, brake rigging on a spaced truck operatively connected to the equalizer connected to said live lever member, independent brake means on the end of said first-mentioned truck comprising a live truck lever supported outwardly of a wheel, a dead truck lever supported inwardly of said wheel, a pull rod interconnecting said truck levers intermediate the ends thereof, and a pull rod connecting the equalizer connected to the dead lever member with the live truck member.

7. In a railway vehicle comprising a plurality of car bodies supported on spaced trucks and an intermediate truck providing common support for adjacent car bodies, each truck having a frame with wheel and axle assemblies, the combination of power means mounted on each of said car bodies, live and dead horizontal levers connected at their outer ends to said power means and intermediate their ends to each other, pull rods pivotally connecting the inner ends of said live and dead horizontal levers to equalizers mounted on the associated car body adjacent a spaced truck and said common truck, respectively, operative connections between said equalizers and brake riggings associated respectively with said common truck and with said spaced truck, the brake rigging associated with said spaced truck comprising substantially vertical live truck levers supported adjacent said common truck outwardly of the associated assembly and pivotally connected at their upper ends to the ends of the adjacent equalizer, the rigging associated with said intermediate truck comprising substantially vertical live lever elements supported adjacent said spaced truck outwardly of the associated assembly and connected at their upper ends by pull rods to the ends of the adjacent equalizer, all of said connections lying in a substantially horizontal plane disposed below the level of the frames of said trucks.

NORMAN FLESCH.

REFERENCES CITED

The following references are of record in the file of this patent:

UNITED STATES PATENTS

| Number | Name | Date |
| --- | --- | --- |
| 2,077,661 | Baselt | Apr. 20, 1937 |
| 2,083,541 | Aurien | June 15, 1937 |